United States Patent [19]

Patrick

[11] Patent Number: 4,849,000

[45] Date of Patent: Jul. 18, 1989

[54] METHOD OF MAKING FIBER OPTIC PLATES FOR WIDE ANGLE AND GRADED ACUITY INTENSIFIER TUBES

[75] Inventor: E. Vincent Patrick, Laurel, Md.

[73] Assignee: The United States of America as represented by the Secretary of the Army, Washington, D.C.

[21] Appl. No.: 160,238

[22] Filed: Apr. 21, 1988

Related U.S. Application Data

[62] Division of Ser. No. 935,359, Nov. 26, 1986, Pat. No. 4,755,718.

[51] Int. Cl.⁴ ........ C03B 37/028

[52] U.S. Cl. ........ 65/4.3; 65/4.2; 65/4.1; 65/38

[58] Field of Search ........ 65/4.2, 4.3, 4.1, 38

[56] References Cited

U.S. PATENT DOCUMENTS

| | | | |
|---|---|---|---|
| 3,004,368 | 10/1961 | Hicks, Jr. | 65/38 X |
| 3,216,807 | 11/1965 | Woodcock | 65/38 |
| 3,350,183 | 10/1967 | Siegmund et al. | 65/38 X |
| 3,554,720 | 1/1971 | Crepet | 65/38 X |
| 3,574,582 | 4/1971 | Siegmund et al. | 65/38 X |
| 3,819,442 | 6/1974 | Brushenko | 65/4.2 X |
| 4,175,940 | 11/1979 | Siegmund | 65/38 |
| 4,385,092 | 5/1983 | Singer, Jr. | 65/4.3 X |
| 4,563,614 | 1/1986 | Howorth | 65/4.2 X |

*Primary Examiner*—Arthur Kellogg
*Attorney, Agent, or Firm*—Max L. Harwell; John E. Holford; Anthony T. Lane

[57] ABSTRACT

New fiber optic elements and a new microchannel plate for proximity focussed image intensifier tubes and a method for making them are provided. Higher resolution is provided at the center of the field of view by the use of graded fiber and channel sizes and by the use of convex and concave surfaces in proximity focus.

4 Claims, 2 Drawing Sheets

METHOD OF MAKING FIBER OPTIC PLATES FOR WIDE ANGLE AND GRADED ACUITY INTENSIFIER TUBES

The invention described herein may be manufactured, used, and licensed by the U.S. Government of governmental purposes without the payment of any royalties thereon.

This is a division of application Ser. No. 935,359, filed 11/26/86, now U.S. Pat. No. 4,755,718.

DESCRIPTION OF PRIOR ART

The structure of image intensifier tubes have essentially evolved along two lines. One version uses electrostatic focussing between a spherically concave photocathode and a similarly shaped anode screen. Another version used proximity focussing of the electron image by maintaining minimal spacing between a flat photocathode and a flat screen anode. Microchannel plates of electron multipliers have been developed for both of these tubes. One example of a flat microchannel plate positioned in proximity focus between a flat photocathode and a flat anode is shown in a U.S. patent application Ser. No. 289,016, filed July 31, 1981, entitled Low Light Level Intensifier Camera Tube, by Nicholas A. Diakedes, which is commonly assigned and is now abandoned. A curved microchannel plate is shown in the U.S. Pat. No. 3,487,258 for an "Image Intensifier with Channel Secondary Emission Electron Multiplier Having Tilted Channels", issued to B. W. Manley et al, Dec. 30, 1969. Both types of image intensifier tube use fiber optics to form the faceplates of the tube, on which the cathode and screen are mounted.

A large fraction of the manufacturing technology and manufacturing steps for both the microchannel plate and the fiber optic faceplate are essentially identical. Herein the generic term "fiber bundle plate" is used to denote both the microchannel plate and the fiber optic faceplate when there is no need to distinguish between the two.

In the manufacture of a fiber bundle plate, care is taken to maintain uniformity in the fibers from which it is constructed. In particular, the gain in each channel of the microchannel plate is critically related to the ratio of the fiber length to its inside diameter. The diameters are equalized by submitting every fiber to the same drawing procedure and the lengths are equalized by grinding the plate surfaces parallel. Sharp corners, formed at the edges of a fiber bundle plate by the grinding or cutting of the plate surfaces, must be rounded off with cleaning and polishing steps to prevent arcing in the finished tube structure.

SUMMARY OF THE INVENTION

The present invention relates to graded resolution image intensifiers, wherein the resolution in various regions of the display is increased at the expense of resolution elsewhere in order to obtain other enhanced properties such as increased field of view, higher center acuity, higher voltage breakdown levels and reduced stress on the user. In particular a novel microchannel plate, fiber optic faceplate, and a novel proximity focus configuration are provided such that the intensifier has uniform gain but varying resolution or spatial frequency and has the useful properties mentioned above.

BRIEF DESCRIPTION OF THE DRAWINGS

The drawings are best understood with reference to the figures, wherein.

DESCRIPTION OF PREFERRED EMBODIMENT

Figure 1A:
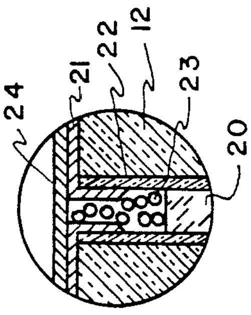
FIG. 1A shows a detail of one optical fiber in the faceplate of FIG. 1.
Figure 1:
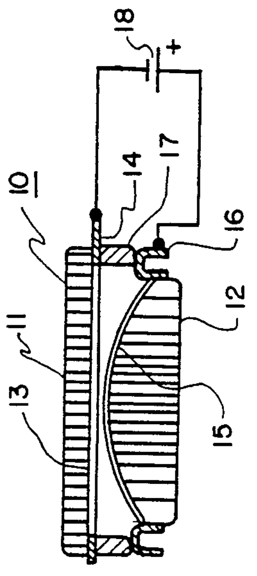
FIG. 1 shows a cutaway edge view of a proximity focus wafer type of image intensifier tube with a fiber optic faceplate according to the present invention.

FIG. 1 shows a side view of a type of proximity focus image intensifier tube 10 according to the present invention. This type is commonly called a wafer diode. The principal elements of the tube are an input faceplate 11 and an output faceplate 12. The input faceplate is transparent to a band of radiation emitted by a scene or object to be viewed. A photocathode 13 is attached to this element and a metal cathode terminal 14 is ohmically attached to the photocathode. A phosphor screen 15 is attached to the output faceplate and an anode terminal 16 makes ohmic contact with the screen. In the present invention the screen is curved, as opposed to the flat screens of the prior art. This will be discussed later. A glass or ceramic ring 17 between electrodes 14 and 16 completes the structure, which is hermetically sealed and evacuated by methods well known in the vacuum electronic tube art. In operation a voltage source 18 is connected between the cathode 14 and the anode 16.

The faceplates are usually formed of fiber optics, which preserve the resolution of the light images that enter and leave the tube. Each fiber defines a light channel the cross-section of which determines the minimum resolution of the tube. In the prior art, substantially the same resolution is normally preserved over the entire surface of the photocathode and screen. When the tube is combined with other optical elements, such as lenses and prisms to form nightsights, binoculars, goggles and the like, the effectiveness of the human eve comes into play.

Figure 2:
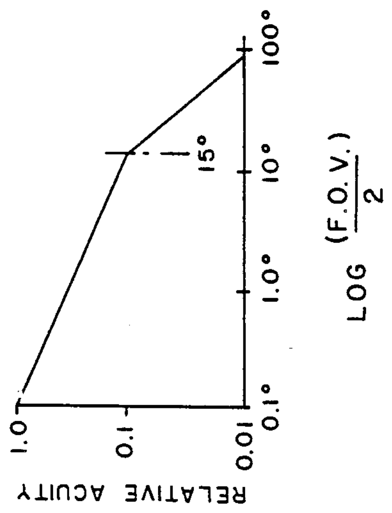
FIG. 2 is a normalized plot of visual acuity as a function of the field of view.

FIG. 2 shows a graph of visual acuity of human eye as a function of the angle of view. At a half angle of about 15° this acuity has dropped an order of magnitude and it drops another order by the time it reaches a half angle 100°. The goggles currently in use cover a half angle of 20°. This half anlge is chose in part to obtain a sufficiently high device resolution, and this device resolution is held constant across the entire field of veiw. The sole advantage to the user of this uniform device resolution is the option to scan the available field of view by eye movement across the display. On the other hand, as the visual acuity curve indicates, for a fixed direction of view by the observer, most of the high resolving capacity of the device just outside the direction of view is wasted. Moreover, because of the limited device field of view, the important peripheral vision of the observer is lost. The peripheral vision is low resolution but is important for orientation, motion detection, and hand and foot coordination. It is possible to trade away the excess off-center device resolution for additional device field of view. In addition, it possible to trade away the excess off-center device resolution for economy or feasibility of manufacture.

The trade off of excess off-center device resolution for manufacturing feasibility is accomplished by the methods below which enable approximately doubling device resolution on center while maintaining or relaxing device resolution off-center. Such a resolution increase is essentially unfeasible for a uniform device resolution design. This increased central resolution can be traded off one for one to get increased field of view: e.g., double the field of view at conventional central resolution. Alternatively, these same methods can be used to trade the excess off-center resolution for economy of manufacture while retaining central resolution.

A first of these methods is a more effective utilization of high and low resolution "multis". Current faceplates contain millions of fibers which are first drawn and fused into multis and then drawn and fused again into the finished size faceplate. A multi is an element which has a preselected cross-sectional shape and size, and in current practice, a fixed number of fibers. The preferred embodiment has a variable number of fibers. A single drawing die of a given shape, e.g. square or hexagonal, can be used to produce a family of multis, each multi having only fibers of one diameter, but different multis using fibers of different diameters. Different multis can then be combined or tesselated as uniform fibers to make faceplate and microchannel plates in the usual manner. Alternatively, the drawing dies may be proportioned to the fiber diameters so that a square multi with 10 mil fibers will have twice the linear dimensions of square multi with 5 mil fibers, for example. Similar relationships can be established for triangular and hexagonal multis.

Figure 3:
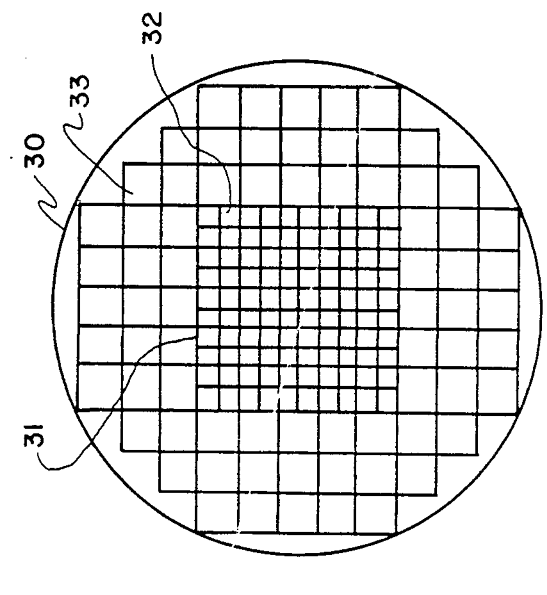
FIG. 3 is a plan view of the faceplate of FIG. 1.

FIG. 3 shows a front view of preferred embodiment of the anode faceplate 30 of FIG. 1 without the screen. A zone 31 of square cross-section, approximately 70% the width and height of the faceplate at the center, is formed of multis 31 made from small diameter fibers, e.g. 5 mils. The remaining cross-sectional zone (about 50% of the plate area) is formed of multis 33 made from larger fibers, e.g. 10 mils. The size of the multis are greatly exaggerated for clarity, they are normally much smaller than shown. The high resolution, small diameter fibers are more expensive to manufacture. they are used only in the central section. Less expensive large fibers are used in the of-center region.

A second of these methods is the use of a convex anode face as shown in FIG. 1. The curved plate 15 in FIG. 1 allows a larger electric field strength at the center between the cathode and screen than is possible with a flat plate with the same center spacing. The electrons will spread more near the edges of the plate, due to the greater spacing, but this is precisely the trade off of off-center resolution for the elimination of edge emission common in current parallel, flat plate designs.

The phosphor screen can be applied to the anode fiber optic face in the usual manner. Alternatively, the phosphor can be intagliated into the fiber optic. With this latter method, there is essentially no resolution degradation due to the phosphor screen and the resolution limits of the screen-fiber optic combination are that of the fiber optic alone.

Intagliation is shown in FIG. 1*a*. The cores 20 of the fibers on the screen surface are etched below the surface of screen faceplate 12 to form pits and a metal layer 21 is deposited on this surface by metal ions with trajectories at an angle substantially less then 90° to the screen faceplate surface. By revolving this fiber optic plate, the metal surface layer 21 is deposited on the plate surface between pits and on the exposed fiber cladding material 22 forming side portions of the pit, leaving the bottom of the pit formed by the exposed end of the fiber core 20 optically transparent. The pits are then packed with phosphor grains 23 creating isolated islands of phosphor and the surface sealed with a second this electron transparent metal layer 24 over the phosphor and ohmically contacting the metal around and between pits. The metal layers and the fiber cladding reflect all photons emitted by an island toward and along the axis of the fiber core.

For practical purposes, the curved anode surface may be spherical, since this shape is easily ground. Although the same result can be obtained by curving the cathode, it is preferred that this element remain flat. The most efficient cathodes now available use epitaxially grown single crystal semiconductors such as gallium-arsenide. For such single crystal growth a flat substrate is preferred.

Figure 4:
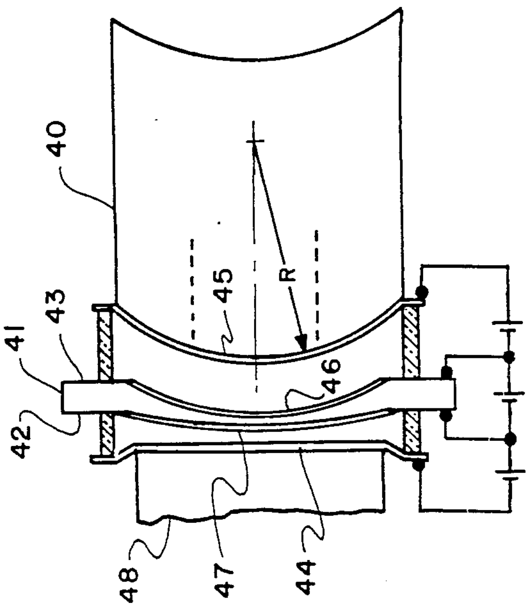
FIG. 4 is a cutaway side view of an image intensifier with a microchannel plate and fiber optics elements according to the present invention.

FIG. 4 shows another form of a proximity focus image intensifier known as a microchannel plate wafer-tube 40. The microchannel plate (MCP) 41 has a structure similar to fiber optics and is manufactured much like the faceplates in FIG. 1. The fiber cores, however, have been completely etched out to form hollow channels and the walls of these channels are formulated and treated to make them efficient secondary electron emitters or electron multipliers. The opposed broad faces of the MCP carry two additional electrodes 42 and 43. The MCP, in an MCP tube, separates the electron path into three parts with accelerating fields provided by three batteries or other potential sources V1, V2 and V3. The photocathode 44 remains flat as in the FIG. 1 tube and the screen anode 45 is still curved convex.

For the case of the microchannel plate water-tube, there are several novel features that will be disclosed. Any single feature can be used to obtain an improved device. Alternatively, several features can be used, each contributing some performance improvement. Finally, all features could be used to obtain the greatest improvement.

First, a flat photocathode and conventional flat MCP can be used with the improved fiber optic faceplate and phosphor screen discussed above.

Figure 7:
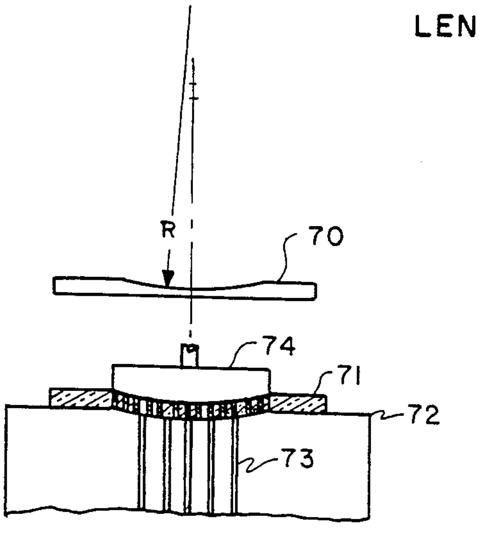
FIG. 7 is a cutaway view of an apparatus forming a sagged microchannel plate according to the present invention.

Second, the flat, parallel faces of the MCP are replaced with a convex input face facing a flat photocothode and a concave output face facing a convex anode. The channel size is constant throughout the MCP and the thickness of the MCP is constant. For spherical surfaces, the input and output face have the same radius of curvature. A method for making the device is described below and an apparatus therefor is shown in FIG. 7. In this second case the anode convexity must be greater than that in the first case so that the edge proximity spacing between anode and MCP is greater than the center proximity spacing.

Third, The electron channels of the MCP can be varied in somewhat the same manner as the light channels in the anode faceplate of FIG. 1. The plate is best made of multis having fibers of continuously varying diameters as a function of their spacing form the center of the plate. Alternatively, the multis can be used to form limited zones. The variation in brightness caused by the zone changes can be tolerated by the user, if the overall gain varies less than 10%.

The change in gain can be compensated b changing the length of the channels to keep the length to diameter ration (L/D) constant. This is done by grinding one face of the MCP into a concave shape. Again a spherical shape is easiest to grind, while this shape obviously may not precisely compensate every stepwise zonal change of the fiber diameter, it is possible, however, to limit the changes in L/D to negligible values.

Figure 5:
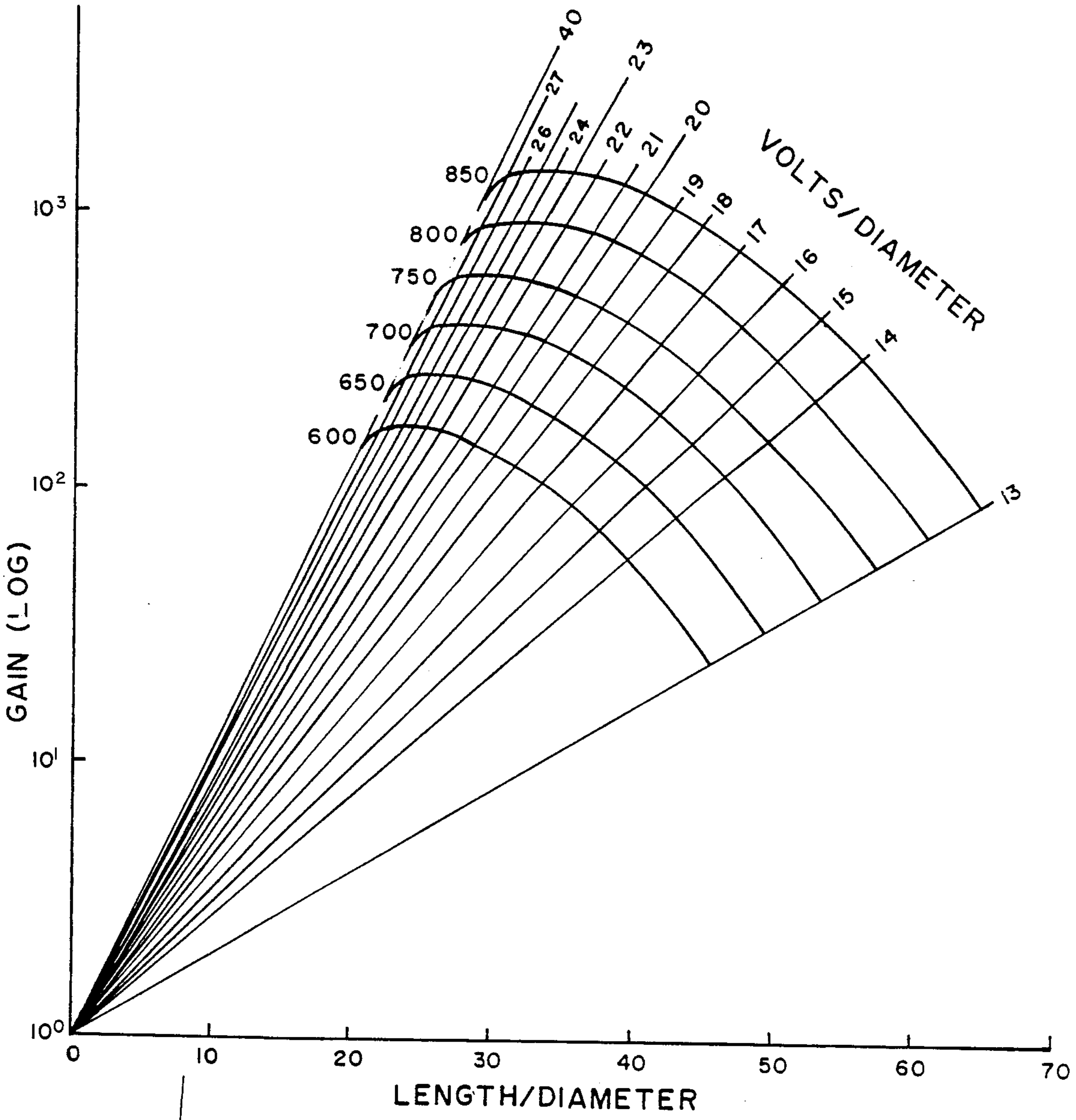
FIG. 5 is a plot of the operating parameters of a microchannel plate.

FIG. 5 shows a normalized plot of current gain for various L/D ratios in a microchannel plate. The curved lines labelled 600–850 represent constant voltage potentials applied across the plate. The curve for 800 volts for example provides maximum gain at about an L/D of 35. The straight lines, labelled 13–40 emanating from the origin represent constant normalized field strengths along the channel in units of voltage per diameter. Note that the peak gain at 800 volts requires an L/D of about 27–40 or 20 to 30 volts per diameter at 800 volts. The slope of the gain is least near the peak of the gain vs L/D curve, where at 35% change in L/D is required (at constant voltage) to produce a 10% change in gain.

This technique of graded channel size and graded MCP thickness is necessary because as channel size decreases for high resolutions, plate thickness must decrease because of fixed length to diameter ratio. If all channels' sizes were cut in half, a plate of half the thickness is required. A conventional plate of half thickness is essentially too fragile to manufacture, process, and mount. The method disclosed here provides for a physically stable plate thinned only near the center.

The radius of curvature proposed by applicant for spherically convex or concave faces of circular fiber bundle plates can be defined as $$R = \frac{r^2 + d^2}{2d},$$

where r is the radius of the fiber bundle plate and d is the change in axial distance relative to a flat face from the center to the edge of the face. A satisfactory value for d in the convex electrode surface nearest the cathode surface is the proximity focus spacing $d_1+d_2$ and $d_1+d_2+d_3$, where $d_1$ is the center proximity focus spacing between the photocathode and the MCP, $d_2$ is the center thickness of the MCP and $d_3$ is the center proximity focus spacing between the MCP and the screen anode. The values all give edge spacings twice the center spacings.

It should be noted that only gradual changes in channel diameters are permissible in an MCP, but there is no such restriction in a faceplate. There is also no problem in combining such an MCP with a faceplate as disclosed at FIG. 3, which incorporates abrupt changes in fiber diameters. The use of intagliation can be confined to the smaller fibers of the screen faceplate, i.e. the central fibers, without significantly reducing the information transmitted to the eye. Peripheral vision is more sensitive to changes than sustained detail. The surfaces of the photocathode and screen faceplates exterior to the MCP tube are normally ground to match the spherical focal planes of the objective and eyepiece lenses.

Figure 6:
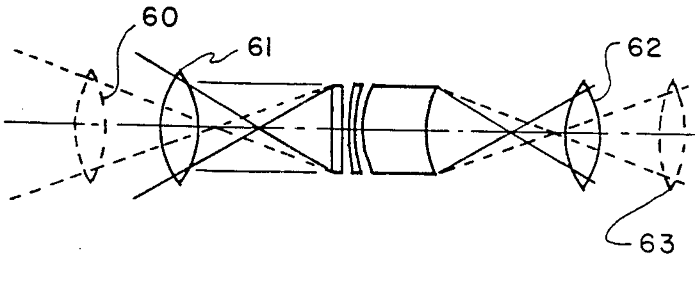
FIG. 6 is a plan view of an optical system used with the improved image intensifier disclosed herein.

As shown in FIG. 6 a typical wafer tube viewing system uses an objective lens 60 and an eyepiece 63 selected and adjusted to provide a 40° field of view. Replacing the uniform resolution wafer tube with applicants graded resolution tube permits the use of a 60° or more wide angle lens system wherein the objective and eyepiece lenses 61 and 62 are placed closer to the tube. The user has equal or better acuity for objects in the center of the screen without losing his awareness of movement in his peripheral field of view.

The following basic method is recommended for the manufacture of fiber bundle plates disclosed herein and includes the following steps:

P1. Forming plurality sets of bundles of laminated glass fibers such that the cross-sectional dimensions of the fibers within each set are uniform, and these same fiber dimensions vary from one set to the next in some logical progression;

P2. Fusing the fibers in each bundle into a single multi having a cross-sectional shape adapted fro tesselation with the remaining multis;

P3. Tesselating the multis into a single fiber optic rope or boule bundle so that the multis having the highest density of fibers per unit of cross-section are located nearest the center of the boule bundle;

P4. Twisting and/or drawing the boule bundle into a boule;

P5. slicing the boule normally into plates of the desired thickness, e.g a twisted image erecting rod is sliced at each 180° of twist;

P6. The cut surfaces are then ground and polished to the degrees of curvature (convex and concave) previously indicated;

If the plate is to be a photocathode faceplate one side is ground flat and the opposite side ground to best match the image plane of an objective lens.

When the plate is used as a screen anode faceplate the following additional steps are employed to obtain the structure of FIG. 1*a:*

S1. Etching the convex surface to remove the core material of the fibers and form pits to a depth of at least one diameter of the core;

S2. Cleaning and plating the same surface by spinning the plate about an axis normal to its center and evaporating a metal at an angle to that axis, so that only an upper portion of the side surfaces of the pits are coated along with the remaining contiguous portions of the original convex surface;

S3. Packing the plated pits with screen phosphers; and

S4. Sealing the pits with a thin layer of metal ohmically bonded to the remaining plated portions of the convex surface.

When the fiber optic plate is used for a microchannel plate the basic process (Steps P1-P6) further includes the following steps:

M1. Etching away all the cores of the fibers;

M2. Hydrogen firing the exposed inner walls of the fibers to increase secondary emissions of electrons; and

M3. Plating the broad concave and convex surfaces by evaporating metal thereon in the manner of step S2 above.

An apparatus which provides an alternative method for forming an MCP is shown in FIG. 7. The basic method is performed as in making a photocathode faceplate, i.e. one surface remains flat. The surface which faces the screen faceplate is ground concave. By this step the thickness of the MCP is varied from center to edge so that the length to diameter ratio of the channels is nearly constant, hence the gain is nearly constant. This provides a blank MCP 70 shown awaiting processing. A finished MCP is shown in a press consisting of a metal template 72 and a metal pressure plate 74. These metal members are curved concave and convex, respectively, to the desired radii of MCP as previously set forth. The press and MCP are heated in a furnace to achieve a suitably low viscosity for the glass of the MCP. Minute gas channels 73 allow gas trapped in the concavity of template 72 to escape or be evacuated as pressue plate 74 descends causing the MCP to sag. Not only does this method avoid a considerable amount of grinding, but it also relieves stresses set up in the MCP by the small amount of grinding that is performed.

Thus the step P6 above is replaced with these steps:

P7. Grinding one surface of the fiber bundle plate to a suitable concavity;

P8. Inserting the MCP in a sagging press with pressure surfaces curved to the radii of curvature desired in the finished plate; and P9. Heating the press and MCP to the suitable temperature for viscous flow of the MCP.

Steps M1–M3 are then performed as before.

I claim:

1. The method of making a fiber bundle plate for a light image intensifier tube, comprising the steps of:

drawing a large number of laminated glass fibers;

separating said fibers into sets of bundles;

drawing all fibers in each bundle into a multi of cross-sectional shape suitable for tesselation with other such multis; wherein each multi in each set of multis contains fibers substantially identical in cross-section, but different in cross-sectional area from the fibers in other sets of multis;

tesselating said multis into a rod shaped boule bundle such that multis containing fibers of smaller cross-section are closer to the center of the bundle;

drawing said multis together into a boule;

slicing the resulting boule at an angle to the boule axis close to 90° to form thin plates with parallel broad input and output faces defined by the ends of said fibers.

2. The method according to claim 1, further including the step of:

forming a spherical concave surface on said output face.

3. The method according to claim 1 further including the step of:

forming a spherical convex surface on said input face.

4. The method according to claim 3 further including the step of:

forming a spherical concave surface on said output face, the radius of curvature for said concave surface being substantially smaller than for said convex surface.

* * * * *